(12) United States Patent
Hansen

(10) Patent No.: US 7,631,702 B2
(45) Date of Patent: Dec. 15, 2009

(54) DOUBLE-COATED SINTERED HARD-FACED HARROW DISK BLADES

(75) Inventor: Larry Hansen, Midlothian, IL (US)

(73) Assignee: Canyon Street Crossing Limited Liability Company, Boulder, CO (US)

( * ) Notice: Subject to any disclaimer, the term of this patent is extended or adjusted under 35 U.S.C. 154(b) by 521 days.

(21) Appl. No.: 11/425,054

(22) Filed: Jun. 19, 2006

(65) Prior Publication Data

US 2006/0283609 A1 Dec. 21, 2006

Related U.S. Application Data

(60) Provisional application No. 60/691,544, filed on Jun. 17, 2005.

(51) Int. Cl.
*A01B 59/00* (2006.01)
(52) U.S. Cl. ........................................... 172/604
(58) Field of Classification Search ......... 172/540–544, 172/747, 776, 603, 604, 765, 532, 537, 539; 427/448, 449, 456; 219/146.23, 77, 18; 76/115, 76/112; 56/255, 295; 428/552, 565
See application file for complete search history.

(56) References Cited

U.S. PATENT DOCUMENTS

| 3,056,383 A | 10/1962 | Woock |
| 3,056,693 A | 10/1962 | Woock |
| 3,406,028 A | 10/1968 | Woock |
| RE27,851 E | 12/1973 | Alessi |
| 4,305,272 A * | 12/1981 | Johnson ...................... 148/640 |
| 5,129,437 A | 7/1992 | Nettles et al. |
| 5,297,637 A * | 3/1994 | Rowlett ...................... 172/604 |
| 5,456,323 A | 10/1995 | Hill |
| 6,156,391 A * | 12/2000 | Shum et al. .................. 427/448 |
| 6,206,116 B1 | 3/2001 | Saxman |
| 6,655,882 B2 * | 12/2003 | Heinrich et al. ............. 408/144 |
| 6,908,688 B1 * | 6/2005 | Majagi et al. ............... 428/552 |
| 7,194,933 B2 * | 3/2007 | Zhu et al. ..................... 76/115 |

FOREIGN PATENT DOCUMENTS

JP   5501-4960 A   2/1980

* cited by examiner

*Primary Examiner*—Robert E Pezzuto
(74) *Attorney, Agent, or Firm*—Levenfeld Pearlstein, LLC

(57) ABSTRACT

The instant invention relates to a double-coated sintered composition on a hard-faced disk blade for agricultural use as a rotary knife blade of a farm implement termed a harrow wherein the sintered hard-faced composition is applied to both the concave and convex sides of the rotary harrow disk blade to provide protection against soil abrasion and wear.

10 Claims, 1 Drawing Sheet

DOUBLE BAND DURA-FACING

DOUBLE BAND DURA-FACING

DOUBLE-COATED SINTERED HARD-FACED HARROW DISK BLADES

FIELD OF THE INVENTION

The invention relates generally to metal rotary harrow disk blades of farm implements used for cultivating, leveling, and breaking up clods of earth or clay of soil in plowed land to pulverize and smooth the land for planting. The metal blades are applied as the cultivating instrument blades of a harrow to prepare the plowed earth for planting a crop, typically what is termed a field crop. Field crops are agricultural crops as hay, grains (corn, wheat, etc.), and cotton grown on large areas. Field crops typically are grown for commercial purposes. Commercial farming, as is well-known, is a business enterprise wherein improvements in machinery used in cultivating the land are sought and utilized quickly. This invention relates to an improved harrow blade for a field harrow wherein the harrow disk blade of the field harrow demonstrates an improved wear life with less frequency of required replacement. This invention accordingly relates to a sintered hard-faced composition on a double-coated harrow disk blade, which hereafter shall be termed a sintered hard-faced double-coated harrow disk blade as comprising the invented unit wherein the invented coated blade is a tempered metal blade.

BACKGROUND AND RELATED ART

The use of a harrow disk blade in harrow equipment for preparing agricultural land for seeding after plowing is well-known. Indeed, the pulverizing element utilized by a harrow for pulverizing and smothering the soil may be an agricultural tool with spikes, spring teeth and/or disk blades. However, when disk blades were used as the cultivating instrument, it was found that the metal blade had a short wear life without a protective coating of a material to reduce abrasion of the metal surface. Accordingly, methods were devised to apply a hard-faced matrix composition to the surface of the harrow metal blade to protect the metal blade against abrasion and wear.

As a harrow metal blade designed for efficient use, the harrow metal blade has a convex side and a concave side on the opposite side. As the harrow metal disk blade moves through the soil, forces, which can be unequal, are applied to the convex and concave surfaces of the harrow disk blade. Soil type, soil consistency, manner and method of machine cultivation, and soil composition can affect the degree of abrasive forces applied to the harrow metal disk blade. Typically, a hard-faced coating was applied to the convex side of the harrow metal disk blade based on soil abrasion on the convex side of the metal blade to protect the blade against abrasion and wear.

With increased use of highly abrasive soils and increased cultivation of growing areas as in California and Arizona where extensive cultivation is required to prepare a seedbed for planting, it has been found that application of a protective hard-facing coating to the convex side of the harrow metal disk blade was insufficient to protect the concave side of the harrow metal disk blade from excessive wear. Excessive soil forces on the concave unprotected side of the disk blade cause wear of the unprotected steel on the concave side of the harrow metal disk blade. The harrow metal disk blade accordingly wears from its original size to the point where the metal of the harrow disk blade on the concave side is worn sufficiently to cause the protective band of hard-facing coating material on the opposite convex side to chip and to break off.

It is therefore an object of the present invention to provide a method for applying a protective sintered hard-faced composition of carbide refractory materials resistant to surface abrasion and surface wear to the harrow metal disk blade on both the concave and convex sides of the harrow metal disk blade to provide a coated harrow tempered metal disk blade with increased protection against abrasion and wear from highly abrasive soils and from increased cultivation use on both sides of the harrow metal disk.

It is a further object of this invention to provide a double-coated sintered hard-faced harrow tempered metal disk blade for application as a farm implement harrow blade wherein the double-coated sintered hard-faced disk blade has increased resistance to wear and abrasion in highly abrasive soils and use in areas of extensive cultivation wherein the tempered metal blade has increased strength and resiliency from the tempering process.

In its prior art, hard-facing matrix compositions and methods of applying hard-facing to metal articles are taught.

U.S. Pat. No. 3,406,028 to Woock, teaches and claims a hard-facing matrix composition and the method of preparing the composition, which bonds to metals to be protected against abrasion and wear. The matrix comprises carbides such as tungsten carbide, boron carbide, molybdenum carbide, and titanium carbide, the greater percentage of carbides, the greater the wear resistance of the matrix.

U.S. Pat. No. 3,056, 693 to Woock teaches and claims a method of hard-facing a metallic article whereby articles can be hard-faced with an abrasion resistant refractory coating fused to the base metal and by which a wide range of coating thicknesses can be utilized. The patent teaches that the service life of metallic articles can be increased by a factor of several times if the surfaces subject to war can be treated with a coating of hard-facing of refractory material highly resistant to abrasion.

U.S. Pat. No. 3,056,383 to Woock teaches and claims an apparatus for coating metal articles with a layer of hard-facing material. The invented apparatus provides a means for applying a band of the coating mixture to the article along a peripheral portion thereof with one lateral side of the band extending along one surface of the article and the other lateral side of the band extending along the adjacent edge of the article. The invented apparatus also provides means for controlling the thickness of the coating layer on the article undergoing coating.

U.S. Pat. No. 6,206,116 to Saxman teaches a drill bit having a cutter cone assembly defined by a base portion, a nose, a conical surface extending from the base portion formed with a with a first and second row of cutting elements circumferentially arranged. The cutting structure is machined by a series of plunge cuts or lathe turns. For one embodiment, the crest of each cutting element has a general configuration of an ogee curve. A layer of hard facing material is taught but not claimed. The material may be applied to selected areas of the machined cutting structure.

U.S. Pat. No. 5,129,437 to Nettles, et al. for a wood chipper teaches and claims a plurality of segmental knife holders supporting a removable knife blade assembly. The log-facing surface of the knife holder is helicoid rather than flat. The knife holders each have a base plate which removably mounts onto said disk and a wear plate replaceably affixed by welding onto a proximal face of the base plate and having a helicoid proximal surface rather than flat surface. A hard facing of a predetermined thickness is formed on its proximal surface with a thickness of 0.20 to 0.050 inches. The hard facing is formed by a thermal spray treatment with powdered tungsten carbide.

U.S. Pat. No. 5,456,323 to Hill teaches and claims an agricultural sweep for cutting through the ground to till the ground. The sweep has a wear resistant cutting surface for rendering the stem of the sweep resistant to abrasion. The wear resistant surface is composed of an alloy compound.

Japanese Publication JP 5501 4960A to Mesato teaches a blade coating by metal spraying to increase the durability of the blade. At least every alternate layer coating is sprayed with Ni—Cr—B—Si alloy. A tungsten-carbon compound is sprayed on the front of the revolving blade and the back face of the rear edge. The concave surface is coated with the same material.

U.S. Pat. RE27,851 to Alessi teaches and claims a hard facing composition for application to a metal base to resist abrasion comprising a powdered alloy having a composition by weight of 1% to 3% carbon; 13% to 17% chromium; 3% to 7% nickel; 2.25% to 7% silica; 0.2% to 0.5% manganese; 2% to 4% borin, and 65% to 75% iron; about 3% of a potassium borate flux; up to about 15% by weight of water as a liquid vehicle; and about 1% bentonite clay as a suspension agent.

SUMMARY OF THE INVENTION

The invention relates to a sintered hard-faced double-coated harrow disk blade of farm cultivating equipment wherein a double band of sintered hard-faced protective material is applied to both sides of a harrow tempered metal convex/concave disk blade of a farm harrow implement and to a method for applying said hard-faced protective material to said harrow metal disk blade and tempering said metal disk. The farm implement is an agricultural harrow with metal rotary disks for leveling and breaking up clods of earth or clay in plowed land to prepare the soil for planting. The tempered metal rotary disks are hard-faced with a hard-facing matrix composition on both the concave and the convex sides of the harrow disk blade to protect the metal disk blade against abrasion and wear. The method of application of the matrix compositions of hard-facing materials comprises application of heat to said applied protective material and said metal disk to sinter said protective material and to temper said metal disk followed by cooling to temper the metal blade, using methods and equipment commercially available.

DESCRIPTION OF THE DRAWING

FIG. 1 is a cross-sectional view of an embodiment of the sintered hard-faced double-coated metal disk blade of 16.00 to 24.00 inch blade diameter of the present invention having hard-facing matrix compositions on both the concave and the convex sides of the rotary disk blade wherein the cross-sectional thickness of the hard-facing matrix on each side of the rotary disk blade is indicated for use on a West Coast agricultural soil. The flow coating buildup over each blade surface is indicated, 1.3 mm/0.05 in. Flow buildup at the coating bandwidth termination point is indicated, 1.9 mm/0.075 in.

DETAILED DESCRIPTION OF THE INVENTION

Figure 1:
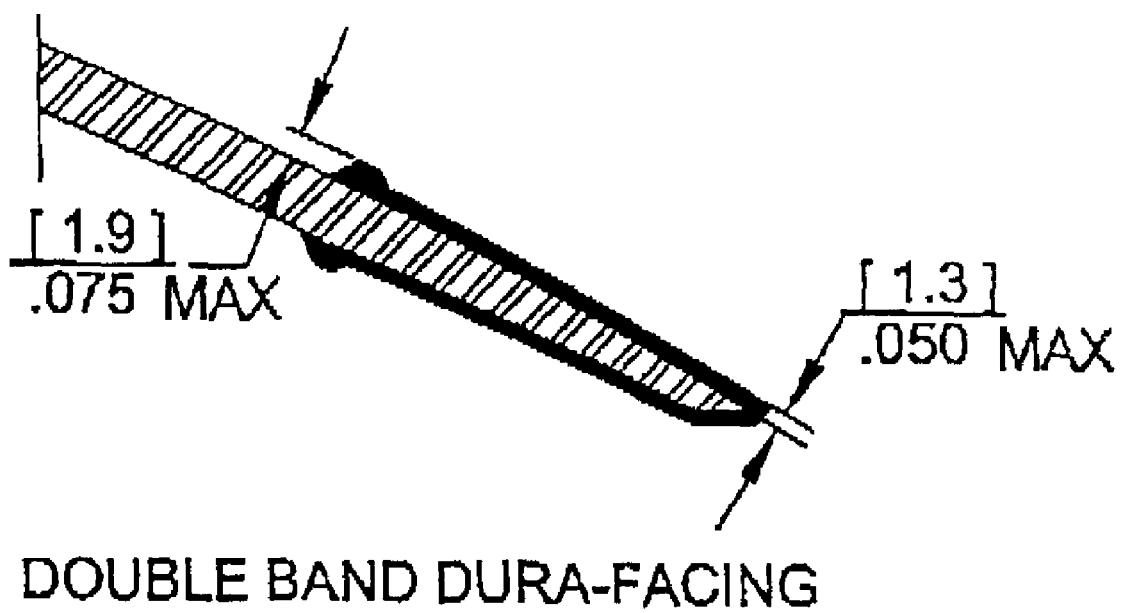

In one embodiment as an example of the invention, commercially available Dura-Facing Alloy No. 6 available from the Ingersoll Manufacturing Company can be applied to the concave side and the convex side of the rotary disk blade. The Ingersoll Dura-Facing Alloy No. 6 provides a wear-resistant abrasion resistant surface to highly abrasive soils and permits extended use of the invented double-coated disk blade in areas where extensive cultivation is required to prepare the agricultural soil for seedbed planting. Hard-facing matrix compositions other than the Ingersoll Dura-Facing Alloy No. 6 can be used such as hard-facing commercially available compositions comprising carbides such as tungsten carbide, boron carbides, molybdenum carbides, and titanium carbide. Selection of an alternative hard-facing composition other than the Ingersoll Dura-Facing Alloy No. 6 can be based on wear life measurements of other hard-faced composition-treated disks. Thickness of the hard-facing composition applied to each disk blade can be based on wear life measurements of other hard-faced composition-treated disks.

As an exemplified embodiment of the sintered hard-faced double-coated composition on a disk blade of this invention comprising a rotary disk blade treated with the Ingersoll Dura-Facing Alloy No. 6, the details of this embodiment are as follows:

The rotary metal disk comprises a steel metal composition resistant to corrosion and suitable for a tempering process to resist metal stress causing deformation. The diameter of the disk can be in two suitable size ranges, one from 16.00 to 24.00 inches, and one from 26.00 to 36.00 inches. Thickness gauge of the rotary steel metal disk is as required by stress applied to the disk during application in field use.

The two surfaces of the rotary steel metal disk of concave and convex surfaces are designed to allow the rotary metal disk to push the engaged earth aside by means of the concave surface as the metal disk passes through the soil. The two surfaces, the concave surface and the convex surface, accordingly experience different degrees of abrasion and wear because of the different surfaces exposed to the action of the abrading soil.

In one exemplified embodiment, example specifications of a hard face slurry of the Ingersoll Dura-Facing Alloy No. 6 applied to each face of the disk blade in a coating bandwidth ranging from 48 mm to 89 mm depending on the metal disk blade diameter is shown in Table 1. In an exemplified embodiment for a West Coast agricultural application, the thickness of the applied Ingersoll Dura-Facing Alloy No. 6 ranges from 0.015 to 0.025 inches on a blade diameter of from 26 inches to 36 inches. A similar or greater thickness can be applied to disks of greater diameter depending on geographical area of agricultural application and use, wherein soil conditions will determine required thickness of the protective Dura-Facing coating.

TABLE 1

Example of Specifications of Sintered Dura-Faced Disks

| Blade Diameter | | | Thickness of Dura-Facing | | Coating Bandwidth Applied | |
|---|---|---|---|---|---|---|
| | | | | | Min. | Max. |
| 406 mm 16.00 in | to | 610 mm 24.00 in | | | 48 mm 1.88 in | 56 mm 2.19 in |
| 660 mm 26.00 in | to | 914 mm 36.00 in | 0.38 mm 0.015 in | 0.64 mm 0.025 in | 73 mm 2.88 in | 89 mm 3.50 in |

In an alternative embodiment, as shown in FIG. 1, Dura-Facing flow buildup on blade surface is 1.3 mm/0.05 inches, to a Dura-Facing flow buildup at coating bandwidth termination point of 1.9 mm/0.075 inches for a blade diameter of 16.00 to 24.00 inches.

In application of the Ingersoll Dura-Faced Alloy No. 6 to the metal disk, the composition of the slurry, the application process, and process improvements are unique to the Ingersoll Dura-Faced Alloy No. 6 as a commercially available composition and process. The unique composition of the slurry, its application process, and process parameters allow bonding or fusing of the hard face material to the metal rotary disk blade. It is understood that any variation or deviation in the composition of the Dura-Faced Alloy No. 6, in the application process, and process parameters may affect the wear life of the finished product, e.g., the sintered hard-faced double-coated harrow disk blade in the field of use.

In the method for applying the hard-faced protective material and tempering the metal disk blade, a slurry of Ingersoll Dura-Facing Alloy No. 6 comprising a liquid slurry mixture of the components of Dura-Facing Alloy No. 6 is applied in the exemplified process at a suitable process temperature to one surface of the metal rotary disk blade of 16.00 to 36.00 inches in diameter in a coating bandwidth depending on blade diameter varying from 48 mm to 89 mm of a thickness of 1.3 mm to a 1.9 mm thickness. The slurry of Ingersoll Dura-Facing Alloy No. 6 is then applied to the second surface of the metal rotary disk blade in a coating bandwidth and thickness as on the first side of the metal rotary disk blade. The metal rotary disk blade is then heated and held at a suitable temperature until the slurry of Ingersoll Dura-Facing Alloy No. 6 bonds as a sintered coherent mass to the sides of the harrow metal rotary disk blade. The heated treated metal blade is then cooled and tempered by quenching to achieve desired metallurgical properties followed by a second tempering process to reduce stress cracking of the metal blade and the sintered mass.

In field use operation, as the sintered hard-faced double-coated harrow disk blade moves and slices through the soil, divergent forces are applied to the two different surfaces of the disk blade in that different forces are applied by the soil to the concave surface of the disk blade than forces applied by the soil to the convex surface of the disk blade. Typically, in the prior art, a protective surface was applied to only the convex side of the disk blade.

The concave surface of the disk blade can experience excessive wear and abrasion, or conversely, the convex surface of the disk blade can experience excessive wear and abrasion, the excess wear and abrasion of either side being dependent upon the configuration of the disk blade and application of the disk blade to the earth, the soil type and other soil characteristics and operating conditions of the soil including moisture content. Accordingly, the conditions of application of use can cause wear to the unprotected metal surface of the metal disk, if the metal surface is unprotected. The soil forces on the concave side of the metal disk blade have been observed as being very low compared to the soil forces on the convex side of the metal blade.

Previous methods of protecting the metal surface of the metal disk included application of a hard-faced surface to only one surface of the metal disk, either to only the concave surface or to the convex surface depending upon the field of use but typically only on the convex side. However, it has been observed that excessive wear can occur on the unprotected side of the metal disk rather than on the protected side, in that the action of the soil forces on the unprotected side of the disk blade causes excessive wear to the unprotected side of the metal disk.

In any event, excessive soil forces on the concave side of the metal disk have been observed to cause wear to the concave side of the metal disk blade wherein the hard surface slurry is applied only to the convex side of the metal disk blade. This has been observed to result in the concave side of the metal disk blade wearing to the point that the hard face coating band on the convex side begins to chip and break off, leaving the metal convex surface unprotected against abrasion and wear where the hard face coating has chipped off.

In an application of the instant invention wherein the metal blade has the hard surface coating applied in a coating band to both surfaces, concave and convex, soil forces present during use act on and apply wear and abrasion forces to two hardened surfaces instead of only one hardened surface. Although, as previously mentioned, the soil forces on the concave side of the metal blade typically are very low as compared to the soil forces on the convex side of the metal blade, other considerations can apply. In some machinery methods of application of the metal disk blade to the soil, the concave side forces can be much higher than the forces on the convex side due to metal blade spacing, metal blade entry into the soil, or the concavity degree of the metal blade itself.

The instant invention accordingly comprises a sintered hard-faced double-coated harrow metal disk blade for use in cultivation of a field to prepare the field to serve as agricultural soil for seedbed planting wherein the metal disk blade with a concave side and a convex side has a sintered protective coating of a hard-faced composition on each side to protect the disk blade from abrasion and wear caused by movement of the metal disk blade through the soil, and the metal blade has been tempered to improve strength and resiliency of the metal.

To the inventor's information, the application of the sintered protective coating of a hard-faced composition to each side of a metal disk with a concave side and a convex side followed by a sintering and tempering process to provide a sintered hard-faced double-coating composition on both sides of the tempered metal disk blade for agricultural use as a blade for an agricultural farm implement harrow has not been taught, implied, or suggested in the prior art.

Based on the inventor's knowledge and experience, the inventor considers the invention comprising the instant method and the resulting sintered hard-faced double-coated composition on tempered metal harrow disk blades for application in cultivating agricultural soils provides at least a wear life for disk blades estimated as double the wear life of an unprotected plain blade and provides extensive maintenance cost savings over maintenance costs incurred by both an unprotected plain blade and a blade with only a single protected surface. The instant invention therefore provides an improved tool for cultivating agricultural soil not heretofore available.

The instant invention accordingly comprises a sintered hard-faced double-coated composition on a rotary tempered metal harrow disk blade for agricultural use of said rotary metal harrow blade as a rotary knife harrow blade of a farm harrow implement wherein said harrow disk blade comprises: (a) a circular tempered metal disk of heavy gauge steel of suitable diameter, up to 36.00 inches, with center mounting for rotation wherein said metal harrow disk is formed to have a concave side and a convex side of said metal disk to form a rotary harrow knife blade, and (b) a protective hard-faced sintered coating composition on each side of said circular metal disk of heavy gauge steel wherein said protective hard-faced coating comprises a durable coating thickness of suitable thickness, from 0.015 inches to 0.025 inches (0.38 to 0.64 mm), applied as a coating bandwidth of suitable bandwidth, of 1.88 to 3.50 inches, to rotary edges of said rotary knife blade concave side and convex side of said metal disk.

In one embodiment, the double-coated sintered protective hard-faced coating composition on a harrow disk blade comprises a matrix composition of carbide refractory materials highly resistant to surface abrasion and surface wear of the protective hard-faced coating composition.

In another embodiment, the double-coated sintered hard-faced composition on a disk blade of the protective hard-faced sintered coating composition comprises an Ingersoll Dura-Facing Alloy No. 6.

The instant invention also comprises said sintered hard-faced double-coated composition on a disk blade wherein the protective sintered hard-faced coating composition is applied to said circular metal disk of heavy gauge steel with center rotation mounting by a treating process comprising: (a) applying a slurry of a mixture of a hard-facing composition at an elevated temperature to said metal disk on both sides of side metal disk to cause said slurry to bond to metal sides of said metal disk on the convex side and on the concave side as coating bandwidth and coating thickness sufficient to provide a finished surface abrasion and surface wear resistant coating on said convex side and said concave side of said metal disk of suitable thickness, of up to 0.025 inches thickness, and a bandwidth of suitable bandwidth, of up to 3.50 inches; (b) applying an elevated temperature to said metal disk and slurry to heat and temper said metal disk and heat said slurry that bonds said slurry to said metal disk and forms a sintered composition as a coherent mass without slurry liquid; (c) applying a quenching solution for a suitable period at a suitable temperature that cools and tempers metal of said heated metal disk and cools said sintered composition thereon wherein metal of said metal disk develops required metallurgical properties for strength and resiliency; and (d) reheating and tempering metal of said cooled metal disk and sintered composition thereon, followed by a second period of cooling and tempering of reheated metal disk and sintered composition thereon to reduce stress cracking of the sintered composition thereon and said metal disk.

The instant invention also comprises a cutting member having a bonded composition on a plurality of sides comprising:
(a) a metal blade cutting member having a convex side and a concave side;
(b) a bonded composition comprising a coating having a thickness in the range of from 0.015 to 0.025 inches and a coating bandwidth in the range from 1.88 inches to 3.50 inches; and
(c) said coating applied as a slurry mixture at an elevated temperature that bonds and sinters said coating to said metal blades and heats metal of said blade;
(d) said coating and said metal blade thereupon being cooled by quenching to temper said metal blade; and
(e) said coating and said metal blade thereupon being reheated and cooled to temper metal of said blade and reduce stress cracking of said coating.

The instant invention also comprises a harrow metal cutting disk blade with a cutting member wherein the said cutting member comprises a double band of sintered hard-faced coating applied to said plurality of sides of said cutting disk wherein said cutting disk is concave and convex and said double band forms a band around the perimeter.

The instant invention further comprises a rotary metal disk blade having a bonded composition on a plurality of sides comprising:
(a) a blade cutting member having a convex side and a concave side;
(b) said bonded composition having a thickness in the range of 0.015 to 0.025 inches and a coating bandwidth in the range of 1.88 inches to 3.50 inches, and
(c) said coating applied as a slurry mixture at an elevated temperature process of bonding, quenching and reheating.

The instant invention also comprises said rotary metal disk blade wherein a double band of sintered material is bonded to said plurality of sides of said rotary metal disk blade wherein said metal disk blade is concave and convex, and said double band of sintered material forms a band around the perimeter of said rotary metal disk blade.

What is claimed is:

1. A sintered hard-faced double coated rotary tempered metal harrow disk blade of a farm harrow implement wherein said harrow disk blade comprises:

(a) a circular metal disk of heavy gauge steel of suitable diameter with rotation center mounting wherein said metal disk is formed with a concave side and a convex side, said disk comprising a blade edge formed at an intersection of said concave side and said convex side; and (b) a protective sintered hard-faced coating on each side of said circular metal disk of heavy gauge steel wherein said hard-faced coating comprises a durable coating thickness of suitable thickness applied as a coating width of suitable width to said rotary knife blade concave side and convex side of said metal disk of said sintered hard-faced double-coated rotary metal harrow disk blade, the coating covering at least a portion of the convex side and at least a portion of the concave side and extending from the convex side around the edge to the concave side.

2. The disk blade of claim 1 wherein said coating comprises a matrix composition of carbide refractory materials resistant to surface abrasion and surface wear of the disk blade.

3. The disk blade of claim 1 wherein said coating comprises Ingersoll Dura-Facing Alloy No. 6.

4. The disk blade of claim 1 wherein said coating is applied to said disk by a treating process comprising the steps of:
(a) applying a slurry of a liquid form of said coating at an elevated temperature to said disk on said convex and concave sides and said edge of said disk;
(b) applying an elevated temperature to said disk and slurry to heat said disk and said slurry and to bond said slurry to said disk to form a sintered composition as a coherent mass without slurry liquid;
(c) applying a quenching solution at a suitable temperature and period of time to cool and temper said disk and said sintered composition to temper said disk; and
(d) reheating said disk and sintered composition to temper said disk and said sintered composition and cooling said disk and sintered composition to temper said disk and to reduce stress cracking of the sintered composition and said metal disk.

5. The disk blade of claim 1 wherein said coating is surface abrasion resistant and surface wear resistant.

6. The disk blade of claim 1 wherein said diameter is in the range of from 24.00 inches to 36.00 inches.

7. The disk blade of claim 1 wherein said durable coating thickness is in the range of from 0.015 inches to 0.025 inches (0.38 mm to 0.64mm).

8. The disk blade of claim 1 wherein said coating width is in the range of from 1.88 inches to 3.50 inches.

9. A cutting member comprising:
(a) a disk having a convex and concave side and an edge formed at the intersection of the convex side and the concave side; and
(b) a sintered coating having a thickness in the range of 0.015 inches to 0.025 inches and a width in the range of 1.88 inches to 3.50 inches, the coating covering at least a portion of the convex side and at least a portion of the concave side and extending from the convex side across the edge to the concave side.

10. The cutting member of claim 9 wherein the coating comprises a matrix composition of carbide refractory materials resistant to surface abrasion and surface wear of the cutting member.

* * * * *

UNITED STATES PATENT AND TRADEMARK OFFICE
CERTIFICATE OF CORRECTION

PATENT NO. : 7,631,702 B2
APPLICATION NO. : 11/425054
DATED : December 15, 2009
INVENTOR(S) : Hansen It is certified that error appears in the above-identified patent and that said Letters Patent is hereby corrected as shown below:

At column 2, line 27, the space inside the referenced patent number should be removed and should read "U.S. Pat. No. 3,056,693 . . . ."

Column 2, line 33 should read "times if the surfaces subject to wear can be treated . . . ."

Column 3, line 18 should read "to 4% boron, and 65% to 75% . . . ."

Signed and Sealed this

Twenty-seventh Day of April, 2010

David J. Kappos
*Director of the United States Patent and Trademark Office*

UNITED STATES PATENT AND TRADEMARK OFFICE
CERTIFICATE OF CORRECTION

| | |
|---|---|
| PATENT NO. | : 7,631,702 B2 |
| APPLICATION NO. | : 11/425054 |
| DATED | : December 15, 2009 |
| INVENTOR(S) | : Larry Hansen |

Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 700 days.

Signed and Sealed this

Second Day of November, 2010

David J. Kappos
*Director of the United States Patent and Trademark Office*